United States Patent [19]

Baumann

[11] Patent Number: 5,038,907

[45] Date of Patent: Aug. 13, 1991

[54] OPERATING DEVICE FOR A MOTOR VEHICLE CLUTCH

[75] Inventor: Hans U. Baumann, Stuttgart, Fed. Rep. of Germany

[73] Assignee: Dr. h.c.F. Porsche AG

[21] Appl. No.: 475,324

[22] Filed: Feb. 5, 1990

[30] Foreign Application Priority Data

Feb. 17, 1989 [DE] Fed. Rep. of Germany ....... 3904837

[51] Int. Cl.[5] ........................ F16D 23/12; G05G 1/14; G60K 23/02

[52] U.S. Cl. .................................... 192/99 S; 74/512; 74/518

[58] Field of Search ................ 192/99 S; 74/512, 518, 74/470

[56] References Cited

U.S. PATENT DOCUMENTS

| | | | |
|---|---|---|---|
| 1,804,903 | 5/1931 | Wemp | 192/99 S |
| 2,096,151 | 10/1937 | Watt | 192/99 S |
| 2,321,513 | 6/1943 | Reed | 192/99 S |
| 3,014,381 | 12/1961 | Frank | 74/512 |
| 3,112,820 | 12/1963 | Falk | 192/99 S |
| 3,199,366 | 8/1965 | Herrington, Jr. | 74/512 |
| 3,199,367 | 8/1965 | Zetye | 74/512 |
| 3,302,763 | 2/1967 | Wobrock | 192/99 S X |
| 4,522,082 | 6/1985 | Musumiya et al. | 74/512 |
| 4,624,152 | 11/1986 | Stotz et al. | 74/518 |
| 4,800,774 | 1/1989 | Hagiwara et al. | 74/512 |
| 4,846,012 | 7/1989 | Papenhagen et al. | 74/512 |

FOREIGN PATENT DOCUMENTS

| | | | |
|---|---|---|---|
| 1152896 | 8/1963 | Fed. Rep. of Germany . | |
| 1186752 | 2/1965 | Fed. Rep. of Germany . | |
| 1902895 | 8/1970 | Fed. Rep. of Germany | 74/518 |
| 2564999 | 11/1985 | France . | |
| 826459 | 1/1960 | United Kingdom . | |

*Primary Examiner*—Richard Lorence

*Attorney, Agent, or Firm*—Evenson, Wands, Edwards, Lenahan & McKeown

[57] ABSTRACT

An operating boosting device for a clutch of a motor vehicle having a pedal under the influence of a prestressed boosting tension spring, which has one end pivotably connected to a fixed point on the vehicle and another end pivotally connected to a pressure rod, which is connected to a lever arm of the pedal at a bearing point. The tension rod exercises a restoring force which holds the pedal in a clutch engaged position and when the clutch is operated and after a dead-center position of the pressure rod is exceeded, applies a force which assists a force of the driver's foot in disengaging the clutch. The pressure rod is pivotably held at the bearing point of the lever arm during each pedal position. The force of the boosting tension spring, in each pedal position, is applied along an action line that extends through the fixed point of the tension spring on the vehicle and through the bearing point of the pressure rod. As a result, after the dead-center position is exceeded, the boosting spring applies a steep rise of boost force to the pedal.

2 Claims, 3 Drawing Sheets

OPERATING DEVICE FOR A MOTOR VEHICLE CLUTCH

BACKGROUND AND SUMMARY OF THE INVENTION

The invention relates to an operating boosting device for a motor vehicle clutch having a pedal which is under the effect of a prestressed tension spring which has one end pivotably connected to a fixed point on the vehicle and another end pivotably connected to a pressure rod which is disposed on a lever arm of the pedal. The tension spring exercises a restoring force holding the pedal in an engaged clutch position and during a clutch disengaging operation and after a dead-center position of the clutch pedal is exceeded, supplies a force boosting the clutch disengagement force of the driver's foot. In DE-AS 11 52 896, an operating device for motor vehicle clutches is known where the pedal is under the effect of a restressed tension spring which, according to the position of the pedal, causes a boost of force through a pressure rod. When the clutch pedal is in an engaged clutch position, the spring exercises a restoring force which holds the pedal in this position. When the pedal is operated, as well as when a dead-center position is exceeded, the spring supplies a force which boosts the force of the foot. The pressure rod has one end fixed with the spring at the vehicle body separated by a relatively large distance from the front bearing point of the pressure rod of the pedal. The swivelling angle of the pedal is relatively large, and a boost of force is obtained because the resulting lever arm rises only slightly after the dead-center position is exceeded. It is an object of the invention to provide an operating device of the above type which causes a steep rise of the boost of force after the dead-center position is exceeded.

According to the invention, this object is achieved by having an action line of the force of the boosting spring extend through the fixed point of the tension spring on the vehicle and through the bearing point of the pressure rod during all pedal positions.

It is also advantageous if the pressure rod is pivotably connected to the lever arm at a bearing point which is arranged at the shortest possible distance with respect to the fixed point mounting the tension spring, during the pedal position corresponding to an engaged clutch position. This shortest distance corresponds to approximately half the width of the lever arm. The pressure rod is U-shaped with the legs that carry the bearings point and the connection of the spring to the rod, respectively.

The principal advantages achieved by the invention are that the stored spring force from the booster tension spring will act upon the clutch pedal as a boosting moment particularly at the time it is operated. After the clutch pedal passes a dead-center position, this boost provides a steep response behavior. The response is achieved by the arrangement of the bearing point of the pressure rod and the tension spring. Thus, the pressure rod can be swivelled around the bearing point on the lever arm of the pedal and the spring can be swivelled with the pressure rod around its fixed point on the vehicle. Even if the swivelling angle of the pedal is small, the arrangement advantageously causes an abruptly rising boosting moment. This effect is increased by having the bearing point of the pressure rod at the lever arm and the fixed point of the tension spring at the vehicle body arranged at the shortest possible distance from one another in a clutch engaged position. This causes the action line of force, the course of which is determined by the position of the bearing point and the pivot point of the clutch pedal, to form a larger lever arm as a result of the swivelling angle of the pedal.

By this arrangement, a fast response behavior is achieved with a steeply rising boosting moment to provide for good clutch synchronizing possibilities and at the same time it requires only a few simple components.

Other objects, advantages and novel features of the present invention will become apparent from the following detailed description of the invention when considered in conjunction with the accompanying drawings.

DETAILED DESCRIPTION OF THE DRAWINGS

Figure 1:
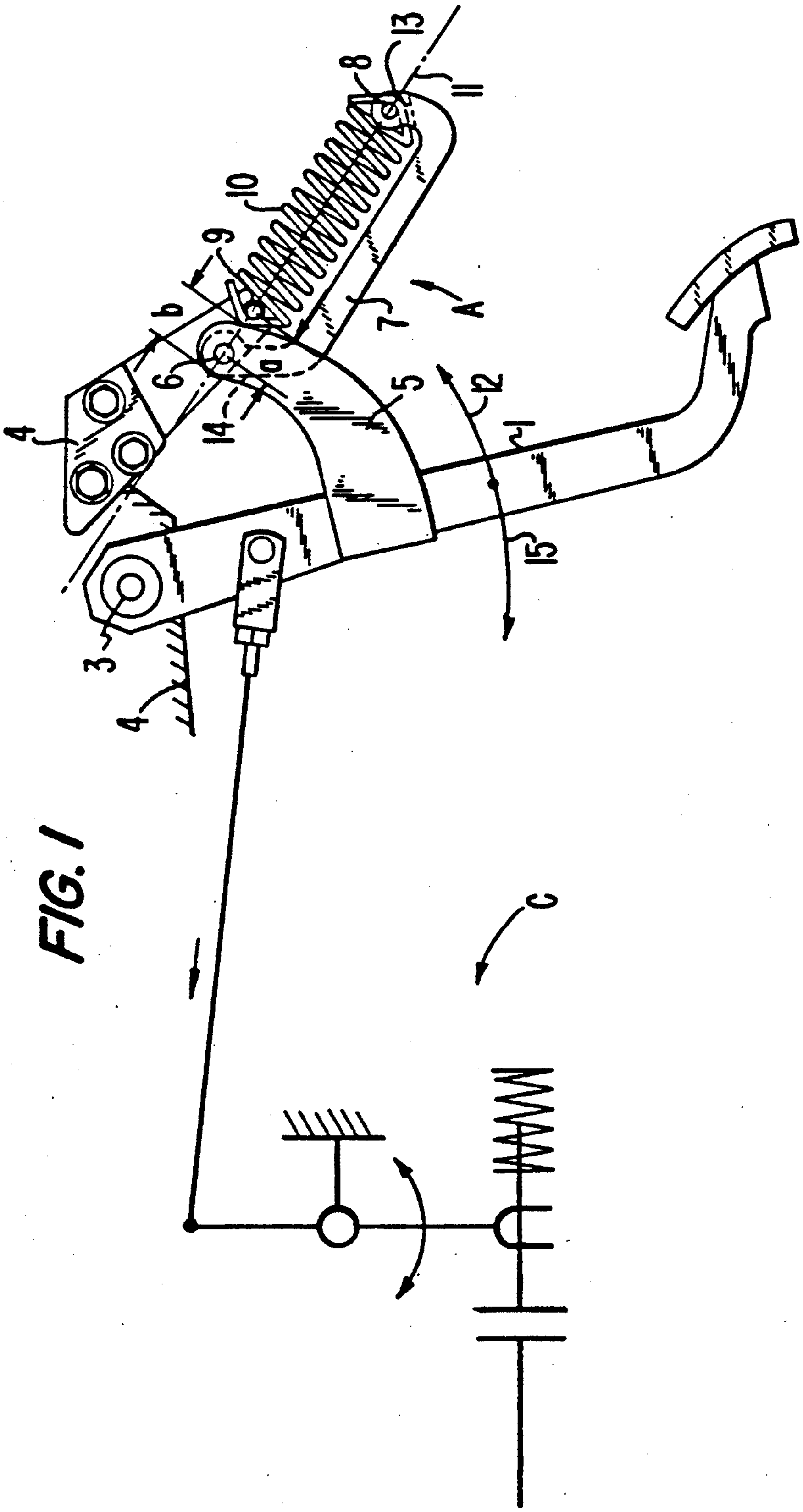
FIG. 1 is a lateral view of an operating device for a clutch when the clutch is engaged.

The operating device for a clutch C comprises a clutch pedal 1 with a pedal plate 2. The clutch pedal 2 is pivotably mounted on a swivel axis 3 connected to the vehicle body 4. The normal pedal return spring (not shown) biases the pedal counter-clockwise to its engage position. The pedal 1 has a projecting lever arm 5 which is connected with a pressure rod 7 by a pivot bearing pin 6. A tension spring 10 is held at the pressure rod 7 between bearing pin 8 on the rod 7 and fixed point 9 connected to the vehicle body 4.

As shown in detail in FIG. 1, the pressure rod 7 (in the engaged position A of the clutch) takes up a position so that an action line 11 of force of the spring 10 extends through the bearing pins 6 and 8 as well as the fixed point 9 of the spring 10 to cause a bias force on the pedal 1 in the direction of arrow 12. The pressure rod 7 consists of a U-shaped stirrup, with legs 13, 14 supporting the bearing pins 6 and 8. In the engaged clutch position (A), the spring 10 is embedded between these legs 13, 14 to apply a force on the pin 8 to bias it upwards along the action line 11.

In the engaged position (A) of the clutch, the bearing pin 6 connecting the pressure rod 7 to the lever arm 5, is arranged at a shortest possible distance (a) to the fixed point 9 of the tension spring 10. The distance (a) corresponds to approximately the width (b) of the lever arm 5.

The clutch pedal 1 is operated from position (A) according to the solid line in FIG. 1 in the direction of arrow 15 for disengaging of the clutch. This movement causes the position of the action line 11 of the spring force to change whereby the spring applies a changing bias to occur with respect to the pedal 1.

Figure 2:
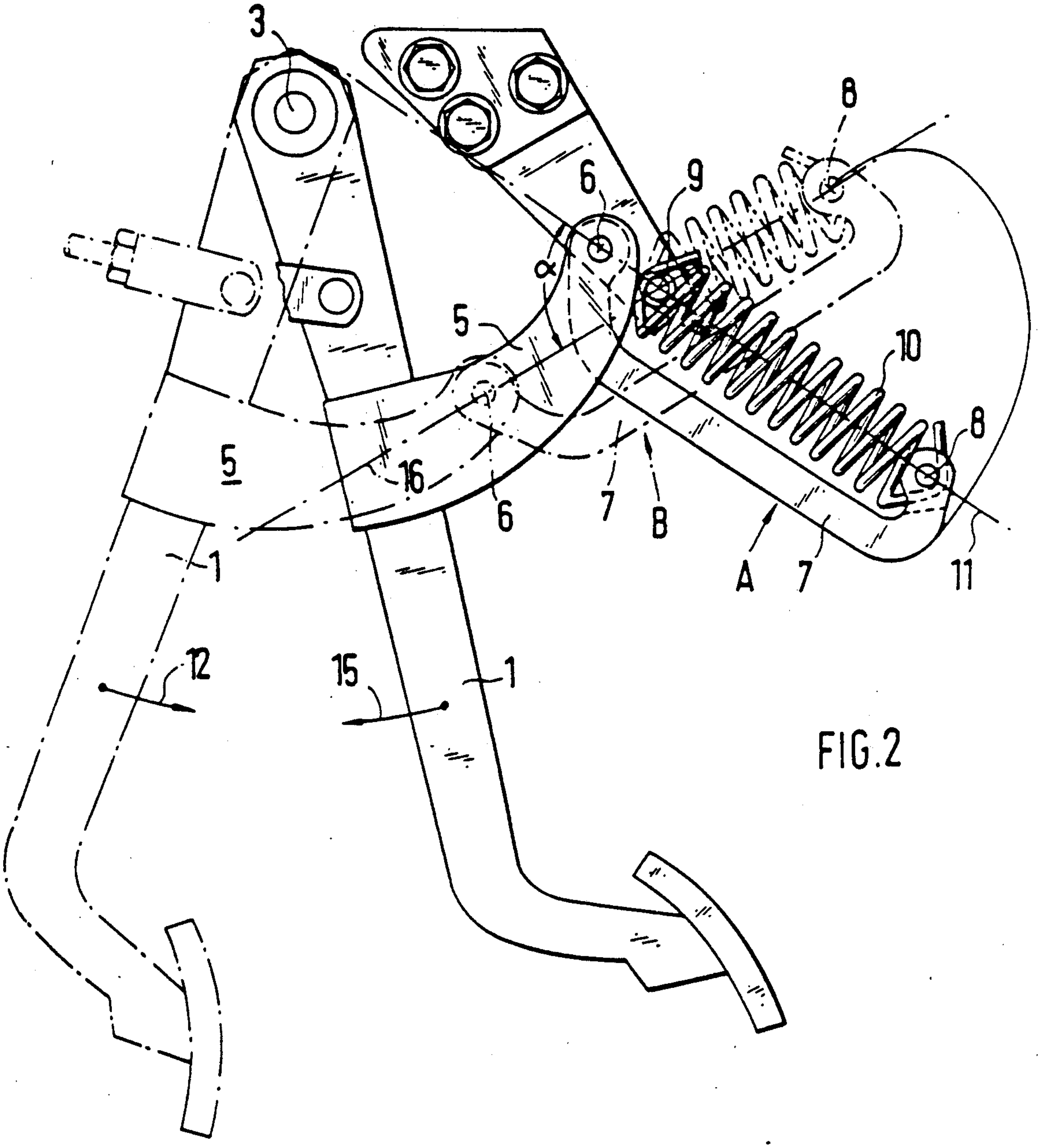
FIG. 2 is a view of the operating device in a clutch engaged (drawn-out lines) end position and in a clutch disengaged (dash-dotted lines) end position.

As shown in FIG. 2, the swivelling of the pedal 1 in the direction of arrow 15 causes the pressure rod 7 to pivot around the bearing pin 6 and the tension spring 10 to pivot around the fixed point 9. The spring 10 contracts during this operation. In the disengaged position (B) of the clutch, (dash-dot lines), the bearing pin 6 reaches its maximum distance from fixed point 9 and defines a new action line 16 of force extending at an acute angle $\alpha$ to action line 11.

Figure 3:
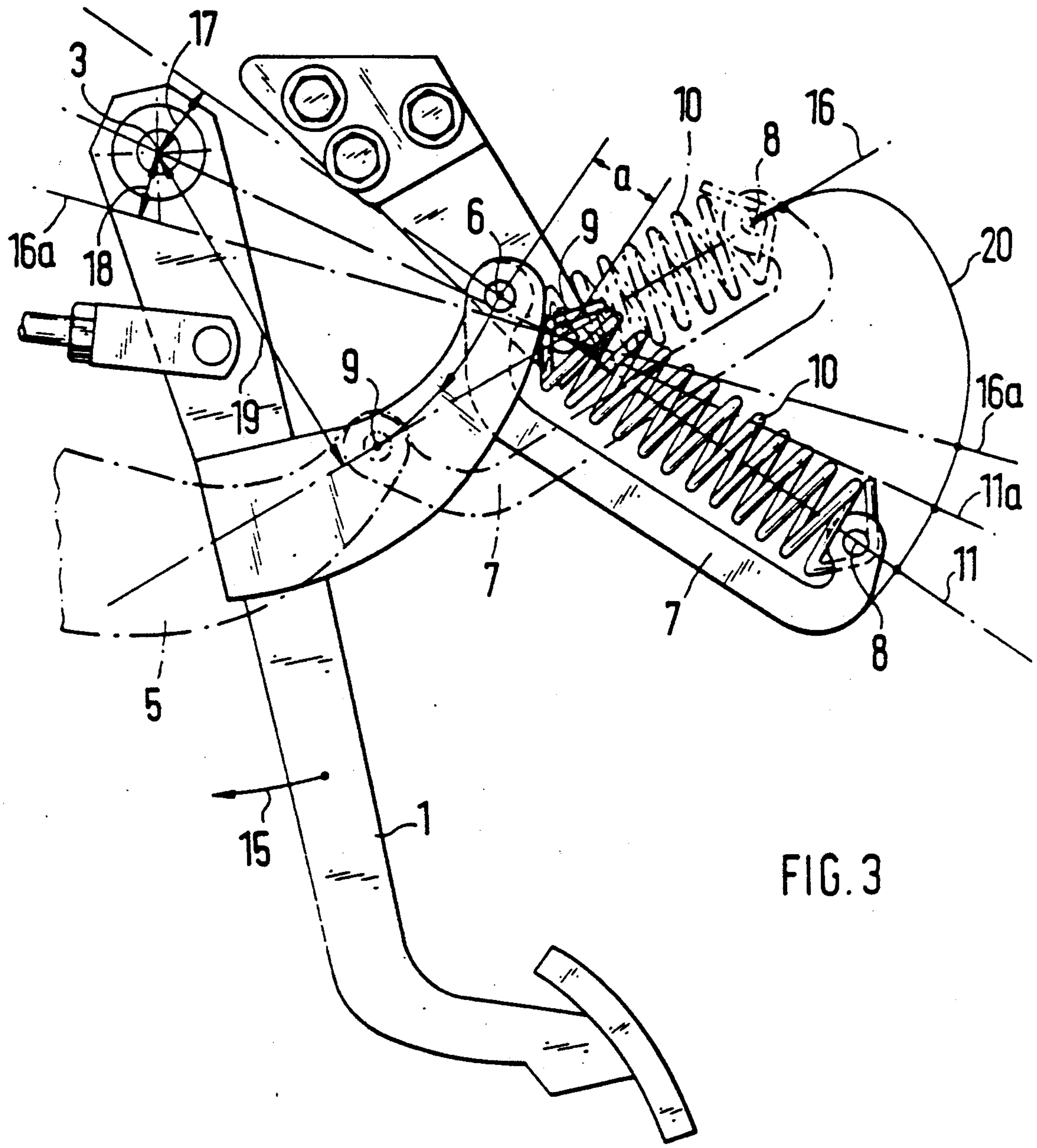
FIG. 3 is a representation of the course of the action lines of force between the disengaged and the engaged position of the clutch.

FIG. 3 shows how the course of the action line is changed between the engaged position (A) and the disengaged position (B). The action line 11, when the clutch is engaged (position A), causes a pedal 1 to be biased to the engaged position as shown by a lever arm 17 which provides a bias force to the pedal holding it in the engage position (A) as pin 8 is forced upwardly along action line 11. When the pedal 1 is operated in the direction of the arrow 15, the action line 11 passes through bearing 3 of pedal 1 until it reaches a dead-center position with bearing 3 and bearing pins 6 and 8 in alignment along an action line 11*a*. At this position the spring 10 produces no bias on the pedal 1 since the line of force passes through pivot 3. As the pedal continues past this action line 11*a* toward the disengaged position (B), the line of force takes up an action line 16*a*. Here the spring 10 applies a bias to the pedal shown by the lever arm 18. This generates a boosting force to the pedal 1 by forcing pin 8 to the left along action line 16. Even though the spring force is reduced as the spring contracts; the force on the pedal 1 increases rapidly as the swivel angle of pedal 1 increases in the direction of arrow 15 due to the fact that the spring force lever arm 18 also increases rapidly to reach its maximum value with the action line 16 and the force lever arm 19. The course of the boosting moment by way of the pedal path is a result of the synchronization of kinematics and characteristic spring values. The faster the force lever arm increases the quicker and greater is the boost from the spring. Of course the boosting action of tension spring 10 and its force on pedal 1, even when it reaches maximum value, can not overcome the force of the normal clutch pedal main return spring (not shown), but rather the boosting spring 10 only applies a force on the pedal that almost cancels out the main spring at the maximum value.

When pedal 1 is swivelled in the direction of arrow 15, the pressure rod 7, as a function of this pedal movement, moves along an arc 20 in such a manner that the action line 11, 11*a*, 16*a*, 16 always extends through bearing points 6, 8 and 9. When the pedal 1 is "let go" and swivels in the direction of arrow 12 due to the force of the normal main return spring (not shown), the pedal 1 as well as the pressure rod 7 with the spring 10 move back into the initial position (A).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An operating boosting device for a clutch of a motor vehicle having a clutch pedal which is biased by a prestressed tension spring;

wherein the prestressed tension spring has one end pivotably connected to a fixed point on the vehicle and another end pivotably connected to a U-shaped pressure rod;

wherein the pressure rod is connected to a lever arm of the pedal at a bearing point such that legs of the U-shaped pressure rod carry the bearing point and connection of the tension spring to the pressure rod, respectively;

wherein the tension spring exercises a force holding the clutch pedal in an engaged clutch position;

wherein, during an operation of the clutch, the clutch pedal is moved from an engaged position to a disengaged position where the pressure rod passes through a dead-center position, and then exceeds this dead-center position to then cause the tension spring to apply a force assisting disengagement of the clutch; and wherein the tension spring always applies a force along an action line that includes a bearing point of the lever arm and the fixed point of the tension spring on the vehicle.

2. An operating boosting device according to claim 1, wherein the pressure rod is pivotably connected to the lever arm at the bearing point and wherein the bearing point is arranged at a shortest possible distance with respect to the fixed point on the vehicle when the clutch pedal is in a clutch engaged position.

* * * * *